US008728307B2

(12) United States Patent
Iacovacci (10) Patent No.: US 8,728,307 B2
(45) Date of Patent: May 20, 2014

(54) WHIRLPOOL SKIMMER

(76) Inventor: Joseph Iacovacci, Paramus, NJ (US)

( * ) Notice: Subject to any disclaimer, the term of this patent is extended or adjusted under 35 U.S.C. 154(b) by 316 days.

(21) Appl. No.: 13/136,987

(22) Filed: Aug. 16, 2011

(65) Prior Publication Data

US 2013/0043185 A1 Feb. 21, 2013

(51) Int. Cl.
*E04H 4/12* (2006.01)
(52) U.S. Cl.
USPC .......................... 210/167.1; 210/416.2; 4/507
(58) Field of Classification Search
USPC ........ 210/167.1, 167.19, 167.2, 242.1, 242.3, 210/416.1, 416.2; 4/507
See application file for complete search history.

(56) References Cited

U.S. PATENT DOCUMENTS

| | | | | |
|---|---|---|---|---|
| 2,989,185 | A * | 6/1961 | Lombardi | 210/776 |
| 3,730,346 | A * | 5/1973 | Prewitt | 210/242.3 |
| 3,753,496 | A * | 8/1973 | Boyd | 210/242.3 |
| 4,024,063 | A * | 5/1977 | Mori | 210/242.1 |
| 4,111,809 | A * | 9/1978 | Pichon | 210/242.1 |
| 4,196,087 | A * | 4/1980 | Gordon | 210/242.3 |
| 4,265,758 | A * | 5/1981 | Fox | 210/242.3 |
| 4,746,424 | A * | 5/1988 | Drew | 210/167.2 |
| 6,027,641 | A * | 2/2000 | Spradbury et al. | 210/167.2 |

* cited by examiner

*Primary Examiner* — Fred Prince
(74) *Attorney, Agent, or Firm* — Michael J. Foycik, Jr.

(57) ABSTRACT

A whirlpool skimming device removes surface debris from a pool by creating a whirlpool having an upper bound at the surface of the pool. The uppermost portion of the whirlpool is free standing and is not bounded by the device. The device includes an outer cup-shaped portion and an inner cup-shaped portion coaxially disposed therein. An opening is disposed in the bottom of the inner cup-shaped portion which communicates with a source of suction which is preferably a Venturi tube feeding the outlet water to a filter bag. There is a first nozzle supplying water at an upper, inner edge of the inner cup-shaped portion at a slightly downward angle in a first direction, and there is a second nozzle supplying water at a lower, outer edge of the inner cup-shaped portion and mounted on an opposite side of the inner cup-shaped portion. The device causes coaxial rotational flow patterns relative to the inner cup-shaped portion, in which the outer rotational flow takes an upwardly spiral path outside the inner cup-shaped portion, and the inner rotational flow takes a downwardly spiral path inside the inner cup-shaped portion of the device.

6 Claims, 6 Drawing Sheets

WHIRLPOOL SKIMMER

FIELD OF THE INVENTION

The present invention relates to a device for skimming liquid and debris from the surface of a pool.

BACKGROUND OF THE INVENTION

Pool cleaning devices are known in the prior art. For example, a skimmer and filter bag are shown in U.S. Pat. No. 5,919,359.

A pool cleaning system with multiple cleaning heads is shown in U.S. Pat. No. 6,022,481.

Further, a liquid surface skimmer with filter bag is shown in U.S. Pat. No. 6,027,641.

A pool skimmer with filter bag and support is shown in U.S. Pat. No. 6,086,759.

A telescopic arrangement is shown in a pool skimmer in U.S. Pat. No. 7,146,658.

A canister filter for a swimming pool is shown in U.S. Pat. No. 7,384,544.

A pool skimmer having a spray head is shown in U.S. Pat. No. 7,455,767.

A circulatory swimming pool cleaning system is shown in U.S. Pat. No. 7,862,712.

There is a need in the art for an efficient, effective pool cleaning device that is capable of readily removing debris such as leaves or insects from the surface of a pool.

There is a need for such an efficient, effective pool cleaning device which is powered by water flow and does not need an external source of power.

Further, there is a need for such an efficient, effective pool cleaning device which operates without requiring large amounts of water flow, and which can operate in conjunction with other pool cleaning equipment such as water pumps and water circulatory systems.

SUMMARY OF THE INVENTION

From the foregoing, it is seen that it is a problem in the art to provide a device meeting the above requirements. According to the present invention, a device and process are provided which meets the aforementioned requirements and needs in the prior art.

Specifically, the device according to the present invention is a whirlpool skimming device for removing surface debris from a pool, by creating a whirlpool having an upper bound at the surface of the pool and where the uppermost portion of the whirlpool is free standing and is not bounded by the device.

The whirlpool skimming device according to the present invention removes surface debris from a pool by creating a whirlpool having an upper bound at the surface of the pool. The uppermost portion of the whirlpool is free standing and is not bounded by the device. The device includes an outer cup-shaped portion and an inner cup-shaped portion coaxially disposed therein. Open opening is disposed in the bottom of the inner cup-shaped portion which communicates with a source of suction. The source of suction is preferably a Venturi tube feeding the outlet water to a filter bag. There is a first nozzle supplying water at an upper, inner edge of the inner cup-shaped portion at a slightly downward angle in a first direction, and there is a second nozzle supplying water at a lower, outer edge of the inner cup-shaped portion and mounted on an opposite side of the inner cup-shaped portion. The second nozzle directs fluid in an approximately opposite direction relative to the first nozzle as viewed from the top of the device, and the second nozzle can be angled slightly downwardly. The first and second nozzles are supplied by tubes communicating with a source of water, and can optionally include valves in the tubes for adjustably controlling the amount of water flowing through the nozzles.

The device of the present invention causes coaxial rotational flow patterns relative to the inner cup-shaped portion, in which the outer rotational flow takes an upwardly spiral path outside the inner cup-shaped portion, and the inner rotational flow takes a downwardly spiral path inside the inner cup-shaped portion of the device. It is believed that the rising outer rotational flow is an important feature of the present invention, which is believed—from inspection of the mass flows from the first and second jets—to narrow and focus the inner vortical flow of the inner rotational flow and thereby direct the force of the vortex above the topmost portion of the funnel portion to the surface of the pool. This beneficial and useful effect is achieved in the working embodiment when the topmost portion of the funnel portion is disposed below the water surface by a distance preferably ranging from one to four inches.

Other objects and advantages of the present invention will be more readily apparent from the following detailed description when read in conjunction with the accompanying drawings.

DETAILED DESCRIPTION OF THE INVENTION

Figure 1:
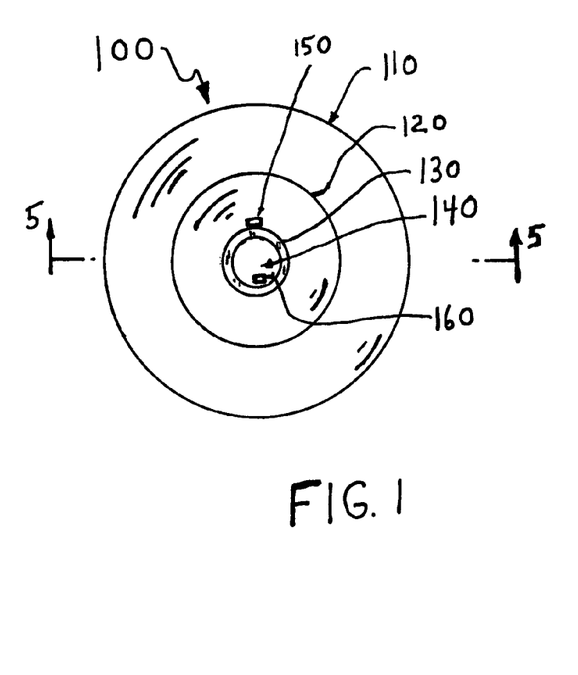
FIG. 1 is a top elevational view of a funnel portion of the device according to the present invention.

FIG. 1 is a top elevational view of a funnel portion 110 of a whirlpool skimming device 100. The funnel portion 110 is generally cup-shaped with an inner, tapering funnel-shaped portion 120 terminating at an opening 140 formed in the lowermost portion of the inner, tapering funnel-shaped portion 120. In this view, an inner cup-shaped portion 130 is generally coaxially disposed within the funnel-shaped portion 120 of the funnel portion 110, and is open at its bottom so as to communicate with the opening 140.

Figure 4:
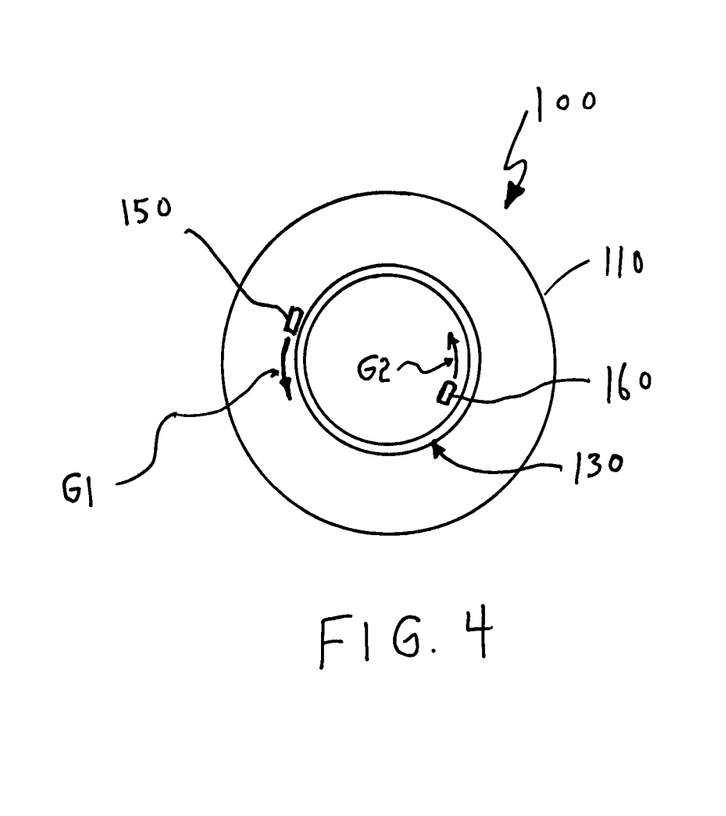
FIG. 4 is an enlarged top elevational view of an inner cup-shaped portion with oppositely directed nozzles, with fluid flow indicated.

As shown in FIG. 1, a pair of nozzles 150 and 160 are disposed adjacent the inner cup-shaped portion 130, with the nozzle 150 being disposed adjacent the outside edge of the inner cup-shaped portion 130 while the nozzle 160 is disposed adjacent the inside edge of the inner cup-shaped portion 130. Fluid flow from these nozzles is depicted in FIG. 4 below.

Figure 2:
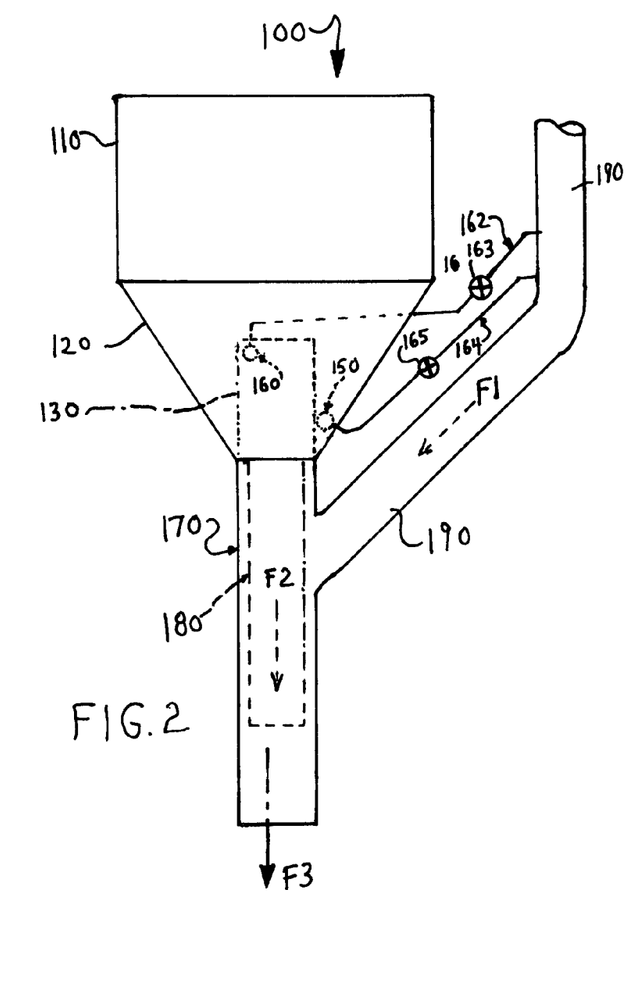
FIG. 2 is a side schematic elevational view of the device according to the present invention, showing hydraulic connections as well as fluid flow through a Venturi section.

FIG. 2 is a side schematic elevational view of the whirlpool skimming device 100, showing pipes 170 and 190 along with hydraulic connections 162 and 164, and an inner coaxial pipe section 180 shown in dashed outline. Arrows F1, F2, and F3 indicate the direction of fluid flow through the pipes 170, 180, and 190. The pipes 170, 180, and 190 have a fluid flow which creates a type of Venturi effect to draw water or other liquid as a fluid flow F2 through the opening 140 powered by the incoming fluid flow F1 through the pipe 190, while discharging the combined liquid as discharge flow F3 through the open end of the pipe 170.

As shown in FIG. 2 in dashed outline, the nozzle 160 is disposed adjacent an upper edge of the inner cup-shaped portion 130, also shown in dashed outline. The nozzle 150, shown in dashed outline, is disposed near a lowermost end of the inner cup-shaped portion 130. The nozzle 150 is disposed along the outside of the inner cup-shaped portion 130, while the nozzle 160 is disposed along the interior side of the inner cup-shaped portion 130. A valve 163 is optionally disposed in the line 162 to regulate fluid flow, and a valve 165 is optionally disposed in the line 164. The valves 163 and 165 can be omitted, and are not necessary to the present invention.

The nozzles 150 and 160 are oppositely directed, so as to direct fluid flow either in a clockwise direction or in a counterclockwise direction. The nozzle 160 is preferably angled slightly downwardly a few degrees. The relative disposition of the nozzles 150 and 160—both vertically and relative to the interior and exterior of the inner cup-shaped portion 130—is important for the highly efficient vortex effect generated by the present invention. However, such disposition can be varied while still creating a vortex effect, albeit with less efficiency, and such variations would be understood by any one having skill in the hydraulic arts.

The conduits 162 and 164 must pass through wall portions of the funnel portion 110, and this preferably should be done to minimize the length of conduits 162 and 164 in the interior of the funnel portion 110 so as to avoid significantly disrupting the vortical flow.

Figure 3:
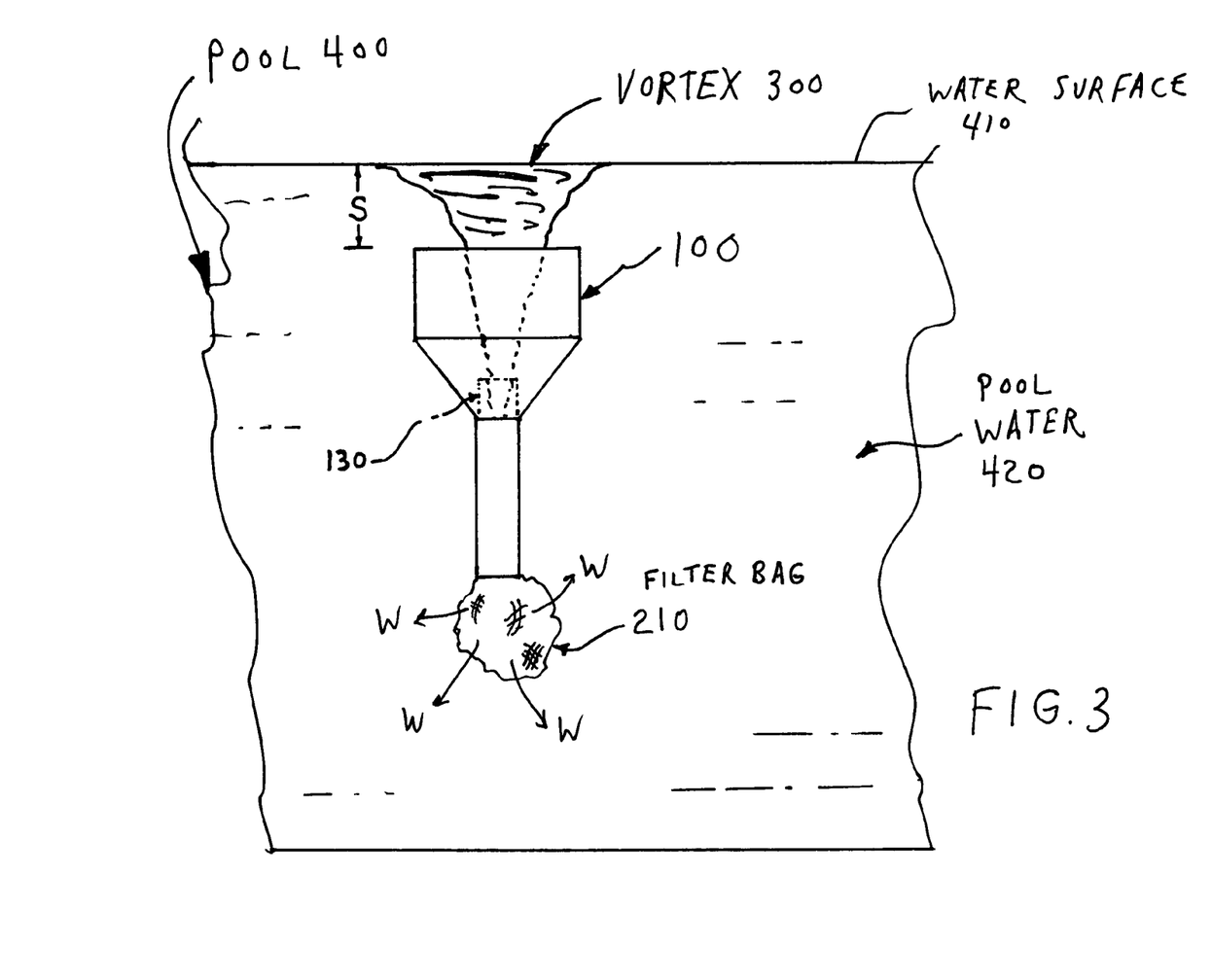
FIG. 3 is a schematic side elevational view of the device of the present invention in operation in a pool, with a vortex or whirlpool caused by the device extending to the upper surface of the pool.

In FIG. 2, the lowermost edge of the inner, tapering funnel-shaped portion 120 is sealed against the lowermost edge of the inner cup-shaped portion 130, such that no fluid can flow out of the bottom of the inner, tapering funnel-shaped portion 120 except via the uppermost opening of the inner cup-shaped portion 130. This fluid flow is shown in FIG. 3. Thus, the fluid jet introduced by the nozzle 150 necessarily cannot exit except by rising. The fluid jet from the nozzle 150 causes a rising, spiral-shaped flow which—due to centrifugal force— presses against the interior wall of the tapering funnel-shaped portion 120. All of the fluid flow from the funnel portion 110 of the whirlpool skimming device 100 is represented by the flow F2, and the total output flow including that introduced by the Venturi portion is F3, as shown in FIG. 2.

FIG. 3 is a schematic side elevational view of the whirlpool skimming device 100 in operation in a pool 400, with a vortex or whirlpool 300 caused by the device extending to the upper surface 410 of the pool. As seen in FIG. 3, an important feature of the present invention is that the uppermost edge of the funnel portion 110 of the whirlpool skimming device 100 lies a distance S below the surface of the pool 400, so that the uppermost portion of the vortex or whirlpool 300 is not bounded in any way by the whirlpool skimming device 100.

Water in the pool is indicated in FIG. 3 as pool water 420.

The whirlpool skimming device 100 removes surface debris from a pool by creating a whirlpool having an upper bound at the surface of the pool. The uppermost portion of the vortex or whirlpool 300 is free standing and is not bounded by the device 100. The vortex or whirlpool 300 is created by the vortical flow caused by the directed water jets from the nozzles 150 and 160 (either clockwise or anticlockwise) together with the suction created by the Venturi from the pipes 170, 180, and 190 which draws the flow F2 through the opening 140 in the funnel portion 110. The liquid in the pipe 190 flows under pressure from a source of pressure such as a pump or a city water main supply, for example.

Since the device would work to skim a liquid surface, it can also be used to clean oil slicks, or for industrial uses, and is not limited to use with water and is not limited to use with pools.

As shown in FIG. 3, the flow through the device 100 exits through a filter bag 210 as shown by the arrows W, so that the leaves and insects, and other debris, are caught in the filter 210. In FIG. 3, supports would be provided to keep the device 100 at the predetermined depth S below the surface; various supports are known in the mechanical support arts and in the swimming pool arts, such as mechanical arms, rigid pipes, floats, and anchors, among others. All such supports are contemplated as being within the scope of the present invention.

While the drawings show that the source of suction is preferably a Venturi tube, the suction in the pipe 180 could instead be directly produced by a water pump hydraulically connected to the outlet of the pipe 180. In that case, the pipes 170 and 190 could be omitted.

FIG. 4 is an enlarged top elevational view of the inner cup-shaped portion 130 with oppositely directed nozzles 150 and 160, with fluid flow jets from the nozzles indicated as G1 and G2 respectively. The funnel portion 110 is also indicated, and is not to scale but shown in reduced size for clarity of illustration.

Figure 5:
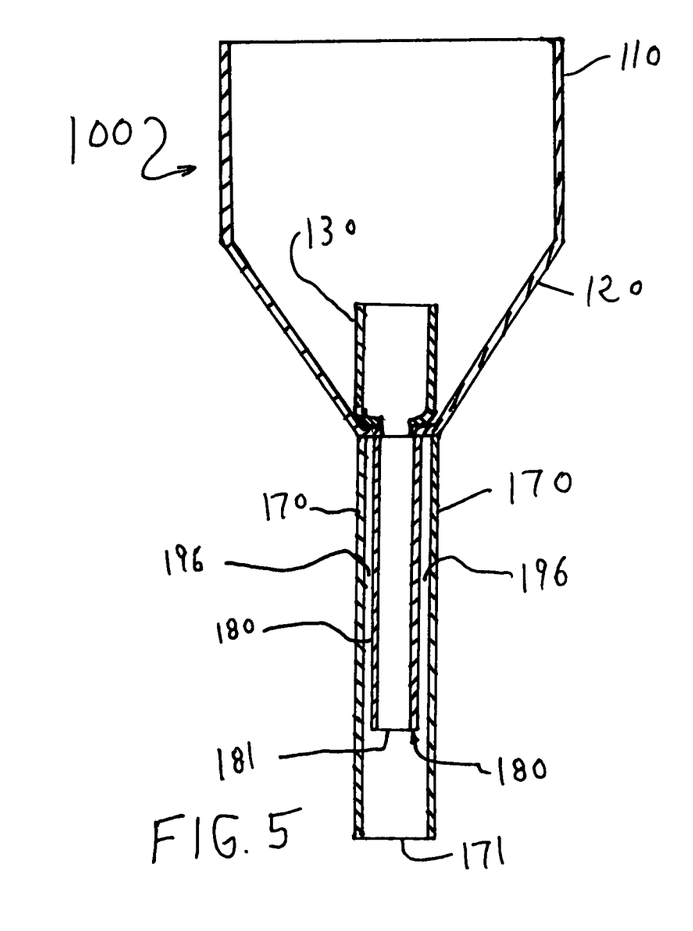
FIG. 5 is a schematic side sectional view taken along line 5-5 of FIG. 1, showing the interior structure of the outlet portion of the device.

FIG. 5 is a schematic side sectional view taken along line 5-5 of FIG. 1, showing the interior structure of the device 100. Here, the parts are as described hereinabove, and the space between the pipes 170 and 180 is shown and is indicated by numerals 196, 196. The space 196 is an annular cylindrical volume through which the water flows that arrives via the pipe 190 (not shown in this view). A lowermost end 181 of the pipe 180 is well within the pipe 170 having a distal end 171, and this feature is important to the production of the Venturi effect to draw water from the end 181 of the pipe 180. The opening 140 is clearly seen in this view.

Figure 6:
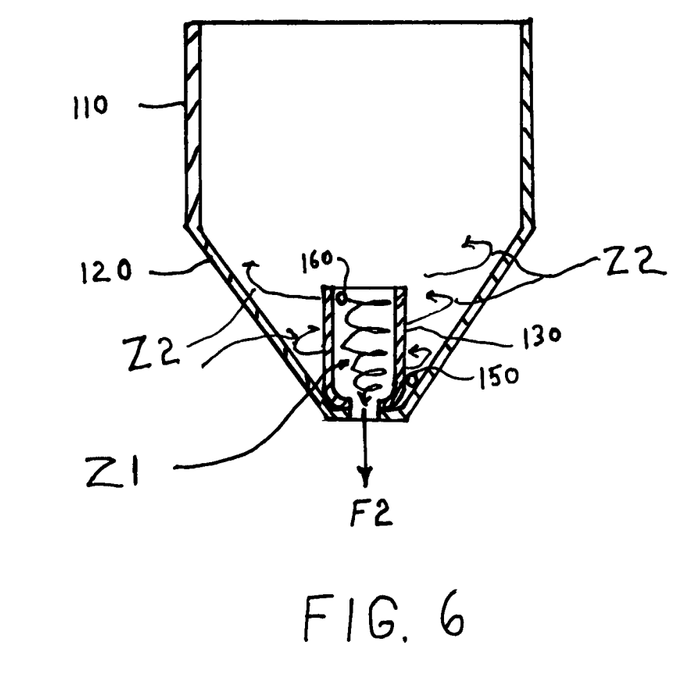
FIG. 6 is a schematic side sectional view similar to FIG. 5, showing coaxial rotational flow patterns relative to the inner cup-shaped portion, in which the outer rotational flow takes an upwardly spiral path outside the inner cup-shaped portion, and the inner rotational flow takes a downwardly spiral path inside the inner cup-shaped portion of the device.

FIG. 6 is a schematic side sectional view similar to FIG. 5, showing coaxial rotational flow patterns Z1 and Z2 relative to the inner cup-shaped portion 130, in which the outer rotational flow Z2 takes an upwardly spiral path outside the inner cup-shaped portion 130, and the inner rotational flow Z1 takes a downwardly spiral path inside the inner cup-shaped portion 130 of the device 100. It is believed that the rising outer rotational flow is an important feature of the present invention, which is believed—from inspection of the mass flows Z1 and Z2—to narrow and focus the inner vortical flow of the inner rotational flow Z1 and thereby direct the force of the vortex above the topmost portion of the funnel portion 110 to the surface 410 of the pool 400. This beneficial and useful effect is achieved in the working embodiment (discussed hereunder) when the topmost portion of the funnel portion 110 is disposed below the surface 410 by a distance preferably ranging from 1 to 4 inches. This is necessary for the usefulness of the vortex, since the topmost edge of the funnel portion 110 would tend to block the flow of water from the surface of the water, and such flow from the surface is necessary to carry leaves, insects, and other debris into the vortex 300.

It is important to keep the whirlpool skimming device 100 oriented so that the topmost edge of the funnel portion 110 lies in a plane parallel to the water surface 410, so that the vortex 300 draws in leaves and debris. If the funnel portion 110 is tilted, the vortex 300 may become less effective; if the tilt is substantial the vortex can even drive away the floating leaves and floating debris rather than drawing them into the vortex 300.

Figures 7, 8:
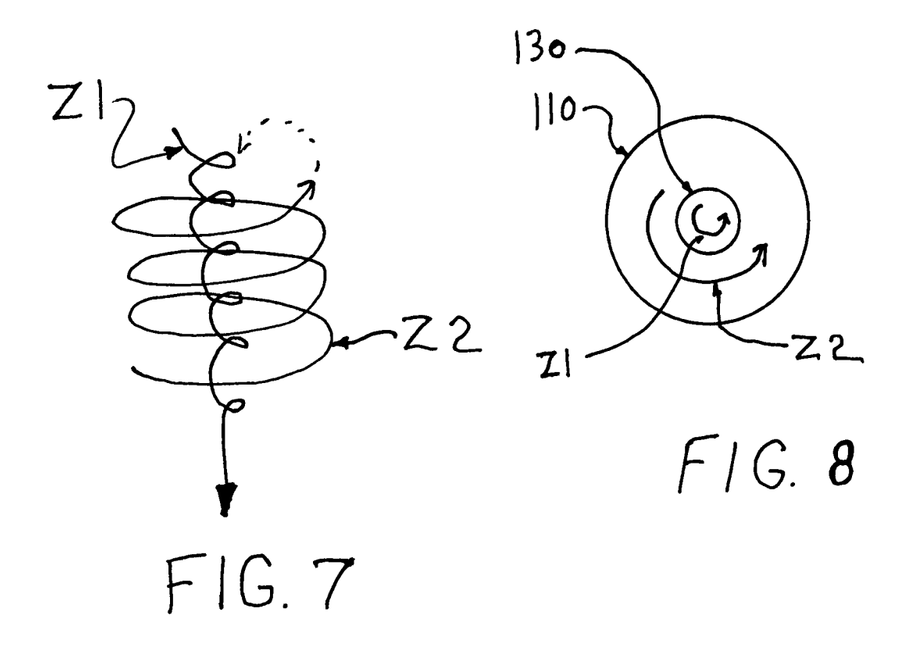
FIG. 7 is a schematic view of the coaxial rotational flow patterns shown in FIG. 6, omitting the structural elements for the sake of clarity, in which the outer rotational flow takes an upwardly spiral path outside the inner cup-shaped portion, and the inner rotational flow takes a downwardly spiral path inside the inner cup-shaped portion of the device.
FIG. 8 is a schematic top elevational view of the coaxial rotational flow patterns shown in FIGS. 6 and 7, schematically showing just the inner cup-shaped portion and the funnel portion, omitting other structural elements for the sake of clarity, in which the outer rotational flow is seen to flow in the same rotational direction as the inner rotational flow.

FIG. 7 is a schematic view of the coaxial rotational flow patterns shown in FIG. 6, omitting the structural elements for the sake of clarity, in which the outer rotational flow takes an upwardly spiral path outside the inner cup-shaped portion, and the inner rotational flow takes a downwardly spiral path inside the inner cup-shaped portion of the device.

FIG. 8 is a schematic top elevational view of the coaxial rotational flow patterns Z1 and Z2 shown in FIGS. 6 and 7, schematically showing just the inner cup-shaped portion 130 and the funnel portion 110, omitting other structural elements for the sake of clarity. In this view, the outer rotational flow Z2 is seen to flow in the same rotational direction as the inner rotational flow Z1. Thus, the rotational flows Z1 and Z2 are parallel and together initially form, and thereafter reinforce, the flow of water forming the vortex 300. The flow outer rotational flow Z2 is initially rising in the vertical direction as described hereinabove, and at some distance above the upper surface of the inner cup-shaped portion 130 the flow Z2 may be pulled into the vortex 300 (shown by the dashed path in FIG. 7 of the flow Z2) to join the downward flow F2 through the inner cup-shaped portion 130.

Working Embodiment

In a working embodiment, the dimensions of the parts are preferably as follows. The pipe 170 can be composed of standard PVC pipe with a 2 inch diameter, and the pipe 180 a similar pipe but with a 1.25 inch diameter. The pipe 190 is preferably similar to the pipe 170, or can be larger or smaller, for example 1.5 inches, as long as it can supply a sufficient water flow. The diameter of the inner cup-shaped portion 130 is three inches in the working embodiment, while the diameter of the funnel portion 110 is nine inches in the working embodiment. The conduits 162 and 164 in the working embodiment are formed by flexible plastic tubing having a one-quarter inch diameter. The length of the funnel portion 110 is ten inches in the working embodiment, and the inner, tapering funnel-shaped portion 120 begins to taper at a point six inches below the uppermost edge of the funnel portion 110 as viewed in FIG. 2. The depth (length) of the inner cup-shaped portion 130 is four inches.

The uppermost edge of the inner cup-shaped portion 130 in the working embodiment is spaced approximately 1.5 inches in a horizontal direction from the side of the funnel-shaped portion 120, and the lowermost edge of the inner cup-shaped portion 130 is spaced approximately ⅛ inch in a horizontal direction from the side of the funnel-shaped portion 120. These dimensions can be varied, and are merely exemplary of the working embodiment. The venturi portion of the pipe, i.e. the coaxially extending pipes 170 and 180, have the following dimensions. The pipe 180 has an inside diameter of 1.25 inches and an outside diameter of 1 and 9/16 inches. The inside diameter of the pipe 170 is approximately 2.0 inches in the working embodiment. The inner pipe 180 may have a smooth outer surface or a threaded outer surface; in the working embodiment the outer surface is threaded.

In use, the working embodiment has been tested with respect to distance of the uppermost edge of the funnel portion 110 below the water surface 410. For an effective vortex 300 sufficient to perform the tasks of removing surface debris and leaves, the minimum distance below the water surface 410 should be about 1 inch, with an optimal depth ranging between about 1 inch to about 3 inches below the water surface 410. The maximum depth for an effective vortex 300 is about 6 inches, with a weaker yet discernable vortex 300 existing even to depths of about 7 to 8 inches below the water surface 410.

The invention being thus described, it will be evident that the same may be varied in many ways. Such variations are not to be regarded as a departure from the spirit and scope of the invention and all such modifications are intended to be included within the scope of the claims.

What is claimed is:

1. A whirlpool skimmer for creating a vortex or whirlpool extending to a surface of a pool for removing debris from the surface of the pool, comprising:

a first cup-shaped member having an interior region bounded by an upper portion and a lower tapering portion, said upper portion having an enlarged open end adapted to receive fluid and said tapering portion having a distal tapered end so as to form a funnel shape; said distal tapered end having an outlet opening;

a second cup-shaped member which is substantially smaller in length and diameter relative to a length and diameter of said first cup-shaped member; said second cup-shaped member having an uppermost edge and a lowermost edge, said lowermost edge being mounted adjacent a lowermost portion of said first cup shaped member and coaxially disposed relative to said first cup-shaped member such that fluid exiting said first cup-shaped member first passes through said second cup-shaped member and then into said outlet opening of said distal tapered end; said second cup-shaped member extending substantially coaxially with said first cup-shaped member, and wherein said uppermost edge of said second cup-shaped member extends only partially into the interior of the tapering portion of the first cup-shaped member; said second cup-shaped member having a generally cylindrical body and having two opposed open ends through which the fluid flows when exiting from said interior region of said first cup-shaped member;

a first jet member mounted in the interior region of said first cup-shaped member such that it is adjacent an outermost surface of said second cup-shaped member and is at a location between said uppermost edge and said lowermost edge of said second cup-shaped member, said first jet member directing liquid in a direction generally orthogonal to a longitudinal axis of said second cup-shaped member to cause a rotational fluid flow in a specified rotational direction; and wherein liquid directed by said first jet member flows toward said uppermost edge of said second cup-shaped member in order to exit through said second cup-shaped member;

a second jet member mounted adjacent an innermost surface of said second cup-shaped member at a location between said uppermost edge and said lowermost edge of said second cup-shaped member for directing liquid in a direction generally orthogonal to a longitudinal axis of said second cup-shaped member to cause a rotational fluid flow in said specified rotational direction; said first and second jet members being arranged so that liquid from each is directed in the same specified rotational direction relative to said longitudinal axis; and a source of suction disposed below said lowermost opening in said second cup-shaped member and below said outlet opening of said distal tapered end of said first cup-shaped portion, such that the combined effect of the suction and the directed liquid from the jets causes formation of a vortex within the first and second cup-shaped members and which vortex extends above the uppermost surface of the first cup-shaped member to the surface of the pool so as to draw in debris, leaves and insects from the surface of the pool.

2. A whirlpool skimmer as claimed in claim 1, further comprising an outlet pipe disposed below said passage, said outlet pipe having a filter bag for removing debris skimmed from the pool surface by the vortex.

3. A whirlpool skimmer as claimed in claim 1, further comprising an outlet pipe disposed below said passage, said outlet pipe having a filter bag for removing debris skimmed from the pool surface by the vortex.

4. A whirlpool skimmer as claimed in claim 1, wherein said second jet member introduces liquid inside the inner wall of the second cup-shaped member in a slightly downward direction.

5. A whirlpool skimmer for creating a vortex or whirlpool extending to a surface of a pool for removing debris from the surface of the pool, comprising:

a first cup-shaped member having an interior region bounded by an upper portion and a lower tapering portion, said upper portion having an enlarged open end adapted to receive fluid and said tapering portion having a distal tapered end so as to form a funnel shape; said distal tapered end having an outlet opening for discharging fluid;

a second cup-shaped member which is substantially smaller in length and diameter relative to a length and diameter of said first cup-shaped member; said second cup-shaped member having an uppermost edge and a lowermost edge, said lowermost edge being mounted adjacent a lowermost portion of said first cup shaped member and coaxially disposed relative to said first cup-shaped member such that fluid exiting said first cup-shaped member first passes through said second cup-shaped member and then into said outlet opening of said distal tapered end; said second cup-shaped member extending substantially coaxially with said first cup-shaped member, and wherein said uppermost edge of said second cup-shaped member extends only partially into the interior of the tapering portion of the first cup-shaped member; said second cup-shaped member having a generally cylindrical body and having two opposed open ends through which the fluid flows when exiting from said interior region of said first cup-shaped member;

a first jet member mounted in the interior region of said first cup-shaped member such that it is adjacent an outermost surface of said second cup-shaped member and is at a location between said uppermost edge and said lowermost edge of said second cup-shaped member, said first jet member directing liquid in a direction generally orthogonal to a longitudinal axis of said second cup-shaped member to cause a rotational fluid flow in a specified rotational direction; and wherein liquid directed by said first jet member flows toward said uppermost edge of said second cup-shaped member in order to exit through said second cup-shaped member;

a second jet member mounted adjacent an innermost surface of said second cup-shaped member at a location between said uppermost edge and said lowermost edge of said second cup-shaped member for directing liquid in a direction generally orthogonal to a longitudinal axis of said second cup-shaped member to cause a rotational fluid flow in said specified rotational direction; said first and second jet members being arranged so that liquid from each is directed in the same specified rotational direction relative to said longitudinal axis; and an outlet pipe connected to receive fluid from said outlet opening of said first cup-shaped member, said outlet pipe having an outlet end; an outer pipe coaxially disposed around said outlet pipe, and a third pipe supplying fluid between said outlet pipe and said outer pipe to create a Venturi effect so as to draw fluid out of said outlet end of said outlet pipe.

6. A whirlpool skimmer for creating a vortex or whirlpool extending to a surface of a pool for removing debris from the surface of the pool, comprising:

a first cup-shaped member having an interior region bounded by an upper portion and a lower tapering portion, said upper portion having an enlarged open end adapted to receive fluid and said tapering portion having a distal tapered end so as to form a funnel shape; said distal tapered end having an outlet opening for discharging fluid;

a second cup-shaped member which is substantially smaller in length and diameter relative to a length and diameter of said first cup-shaped member; said second cup-shaped member having an uppermost edge and a lowermost edge, said lowermost edge being mounted adjacent a lowermost portion of said first cup shaped member and coaxially disposed relative to said first cup-shaped member such that fluid exiting said first cup-shaped member first passes through said second cup-shaped member and then into said outlet opening of said distal tapered end; said second cup-shaped member extending substantially coaxially with said first cup-shaped member, and wherein said uppermost edge of said second cup-shaped member extends only partially into the interior of the tapering portion of the first cup-shaped member; said second cup-shaped member having a generally cylindrical body and having two opposed open ends through which the fluid flows when exiting from said interior region of said first cup-shaped member;

a first jet member mounted in the interior region of said first cup-shaped member such that it is adjacent an outermost surface of said second cup-shaped member and is at a location between said uppermost edge and said lowermost edge of said second cup-shaped member, said first jet member directing liquid in a direction generally orthogonal to a longitudinal axis of said second cup-shaped member to cause a rotational fluid flow in a specified rotational direction; and wherein liquid directed by said first jet member flows toward said uppermost edge of said second cup-shaped member in order to exit through said second cup-shaped member; and a second jet member mounted adjacent an innermost surface of said second cup-shaped member at a location between said uppermost edge and said lowermost edge of said second cup-shaped member for directing liquid in a direction generally orthogonal to a longitudinal axis of said second cup-shaped member to cause a rotational fluid flow in said specified rotational direction; said first and second jet members being arranged so that liquid from each is directed in the same specified rotational direction relative to said longitudinal axis.

* * * * *